(12) United States Patent
Bajpai et al.

(10) Patent No.: US 12,468,799 B2
(45) Date of Patent: Nov. 11, 2025

(54) SYSTEMS AND METHODS FOR AUTHORIZING DEVICES USING A DECENTRALIZED NODE DATABASE

(71) Applicant: BANK OF AMERICA CORPORATION, Charlotte, NC (US)

(72) Inventors: Shashank Kumar Bajpai, Uttar Pradesh (IN); Nisha Dahiya, Delhi (IN); Divya Nagarajan, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/581,553

(22) Filed: Feb. 20, 2024

(65) Prior Publication Data

US 2025/0265328 A1   Aug. 21, 2025

(51) Int. Cl.
  *G06F 21/44* (2013.01)
  *G06F 21/45* (2013.01)
(52) U.S. Cl.
  CPC .............. *G06F 21/44* (2013.01); *G06F 21/45* (2013.01)
(58) Field of Classification Search
  None
  See application file for complete search history.

(56) References Cited

U.S. PATENT DOCUMENTS

| | | | |
|---|---|---|---|
| 8,442,910 B2 | 5/2013 | Morris | |
| 8,799,053 B1 | 8/2014 | Goldberg | |
| 8,966,649 B2 | 2/2015 | Stack | |
| 10,460,126 B2 | 10/2019 | Pead | |
| 11,012,491 B1 | 5/2021 | Kapczynski | |
| 11,171,783 B2* | 11/2021 | Doddavula | ............... H04L 9/50 |
| 11,429,958 B1* | 8/2022 | Michaelis | .......... G06Q 20/4014 |
| 11,748,784 B2 | 9/2023 | Lawbaugh | |
| 11,770,296 B2 | 9/2023 | Nolan | |
| 11,797,698 B2 | 10/2023 | Lavine | |
| 2008/0103971 A1 | 5/2008 | Lukose | |
| 2011/0106610 A1 | 5/2011 | Landis | |
| 2011/0246213 A1 | 10/2011 | Yarvis | |

(Continued)

FOREIGN PATENT DOCUMENTS

| | | | | |
|---|---|---|---|---|
| WO | 2023205142 A1 | 10/2023 | | |
| WO | WO-2025006875 A1 * | 1/2025 | ........... | H04L 9/3247 |
| WO | WO-2025038873 A1 * | 2/2025 | ......... | G06Q 20/3676 |

*Primary Examiner* — Michael Pyzocha
(74) *Attorney, Agent, or Firm* — Moore & Van Allen PLLC; William Walters

(57) ABSTRACT

Systems, computer program products, and methods are described herein for authorizing devices using a decentralized node database. The present disclosure is configured to initiate an authorization request to a resource server, wherein the authorization request comprises encrypted client credentials, and wherein the client credentials are transmitted from a client device; assign roles to nodes, wherein the roles are assigned randomly to the nodes; validate, using the nodes, the client credentials; create a smart contract, wherein the smart contract comprises the authorization request and an authorization mechanism; generate a side chain, wherein the side chain comprises a hash code, the authorization request, and the authorization mechanism; validate, using the hash code, the client device; and generate an encryption key, wherein the client device uses the encryption key to access the resource server.

20 Claims, 6 Drawing Sheets

(56) References Cited

U.S. PATENT DOCUMENTS

| | | | |
|---|---|---|---|
| 2011/0246283 A1 | 10/2011 | Yarvis | |
| 2011/0247029 A1 | 10/2011 | Yarvis | |
| 2012/0246065 A1 | 9/2012 | Yarvis | |
| 2013/0332987 A1 | 12/2013 | Tenneti | |
| 2015/0019323 A1 | 1/2015 | Goldberg | |
| 2015/0169692 A1 | 6/2015 | Klingen | |
| 2015/0170139 A1 | 6/2015 | Klingen | |
| 2019/0294817 A1* | 9/2019 | Hennebert | H04L 9/0861 |
| 2020/0342132 A1* | 10/2020 | Youssef | G06F 16/1834 |
| 2022/0131845 A1* | 4/2022 | Gaddam | H04L 9/14 |
| 2022/0188835 A1 | 6/2022 | Mashologu | |
| 2023/0059580 A1* | 2/2023 | Manevich | H04L 9/3255 |
| 2024/0064021 A1* | 2/2024 | Yan | H04L 9/3247 |
| 2024/0333702 A1* | 10/2024 | Zhu | H04L 9/40 |
| 2025/0097707 A1* | 3/2025 | Balmakhtar | H04L 9/50 |

* cited by examiner

SYSTEMS AND METHODS FOR AUTHORIZING DEVICES USING A DECENTRALIZED NODE DATABASE

TECHNOLOGICAL FIELD

Example embodiments of the present disclosure relate to authorizing devices using a decentralized node database.

BACKGROUND

There are many challenges associated with device authorization. Applicant has identified a number of deficiencies and problems associated with device authorization. Through applied effort, ingenuity, and innovation, many of these identified problems have been solved by developing solutions that are included in embodiments of the present disclosure, many examples of which are described in detail herein.

BRIEF SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for authorizing devices using a decentralized node database.

Embodiments of the present invention address the above needs and/or achieve other advantages by providing apparatuses (e.g., a system, computer program product, and/or other devices) and methods for authorizing devices using a decentralized node database. The system embodiments may comprise a processing device and a non-transitory storage device containing instructions when executed by the processing device, to perform the steps disclosed herein. In computer program product embodiments of the invention, the computer program product comprises a non-transitory computer-readable medium comprising code causing an apparatus to perform the steps disclosed herein. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the steps disclosed herein.

In some embodiments, the present invention initiates an authorization request to a resource server, wherein the authorization request includes encrypted client credentials, and wherein the client credentials are transmitted from a client device. In some embodiments, the present invention assigns roles to nodes, wherein the roles are assigned randomly to the nodes. In some embodiments, the present invention validates, using the nodes, the client credentials. In some embodiments, the present invention creates a smart contract, wherein the smart contract includes the authorization request and an authorization mechanism. In some embodiments, the present invention generates a side chain, wherein the side chain includes a hash code, the authorization request, and the authorization mechanism. In some embodiments, the present invention validates, using the hash code, the client device. In some embodiments, the present invention generates an encryption key, wherein the client device uses the encryption key to access the resource server.

In some embodiments, the assignment of the roles to the nodes is determined by a randomization algorithm.

In some embodiments, the authorization request further includes an access level, wherein the access level defines the client device's ability to interact with the resource server.

In some embodiments, the authorization mechanism further includes a certificate, a token, or a combination of the certificate and the token.

In some embodiments, the authorization mechanism may be determined by the authorization request and a model, wherein the model includes logic to determine the authorization mechanism.

In some embodiments, the nodes further include a certificate generator node (CGN), wherein the CGN generates the authorization mechanism, wherein the authorization mechanism includes a certificate. In some embodiments, the nodes further include an encryption key generator node (EKGN), wherein the EKGN generates the encryption key. In some embodiments, the nodes further include a data validator node (DVN), wherein the DVN validates the client credentials. In some embodiments, the nodes further include a hash code generator node (HCGN), wherein the HCGN generates the hash code. In some embodiments, the nodes further include an access token generator node (ATGN), wherein the ATGN generates the authorization mechanism, wherein the authorization mechanism includes a token.

In some embodiments, the HCGN further includes a sync up interface, wherein the sync up interface updates the hash code based on an alteration of a resource associated with the resource server.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
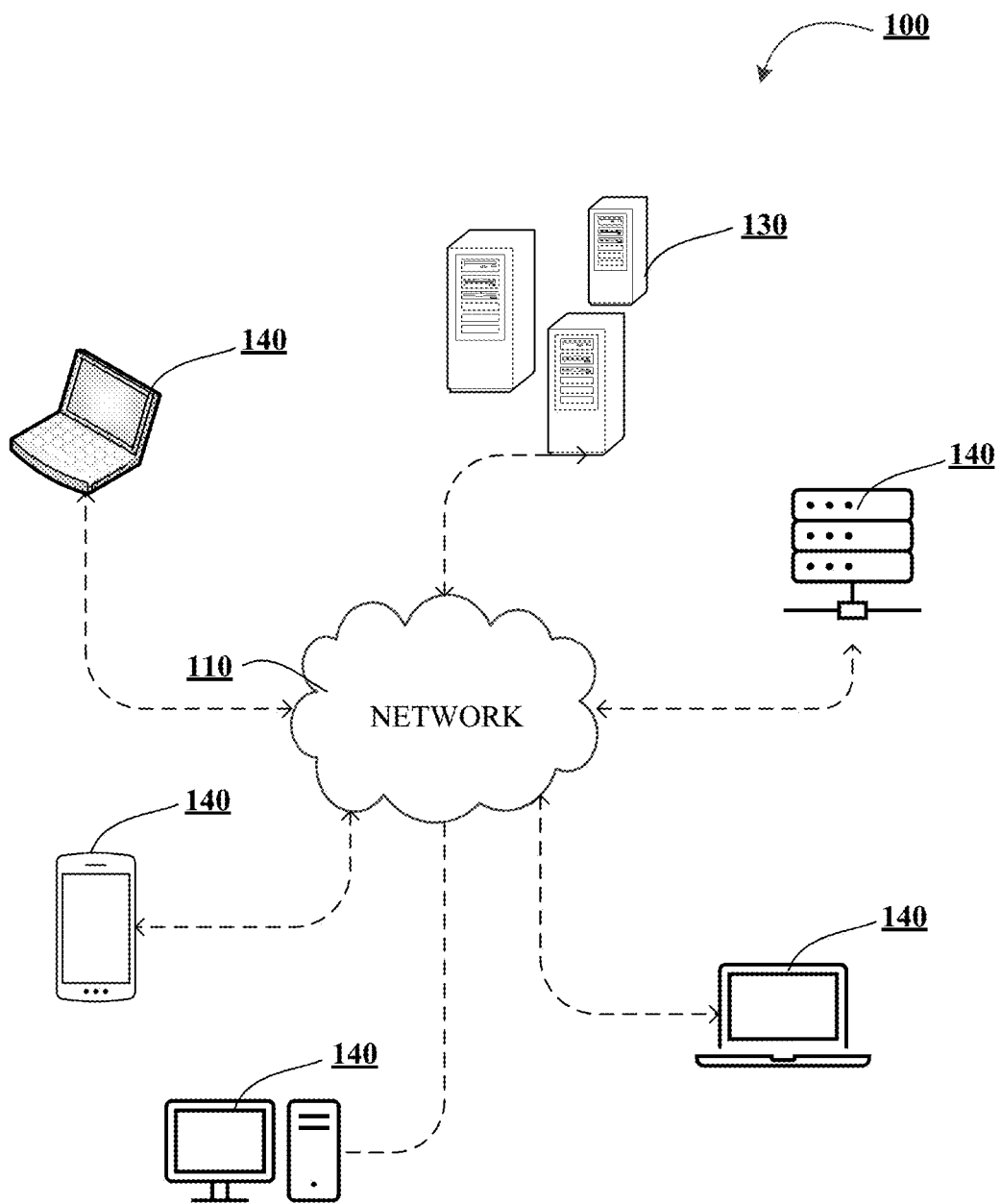
Figure 1B:
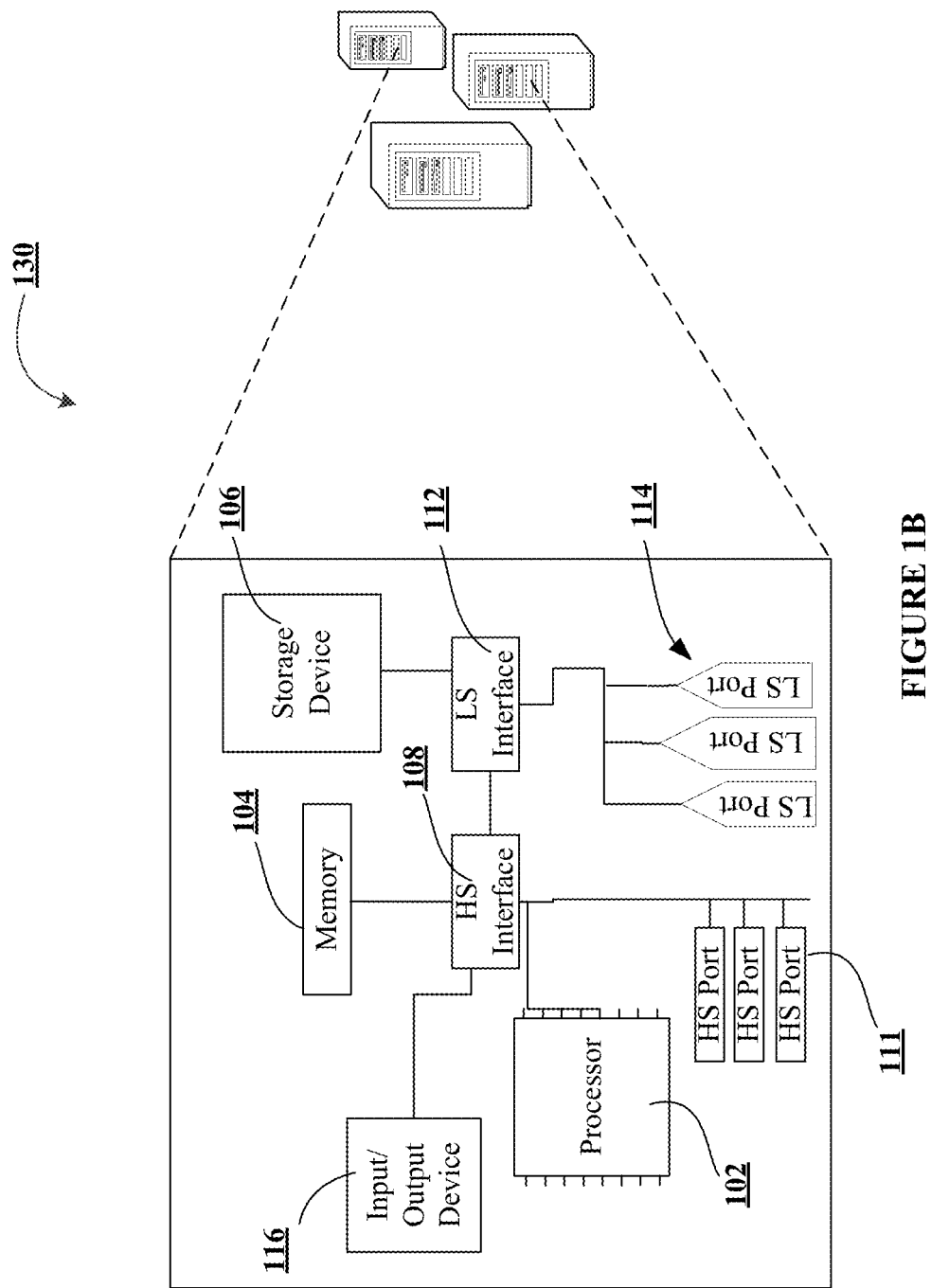
Figure 1C:
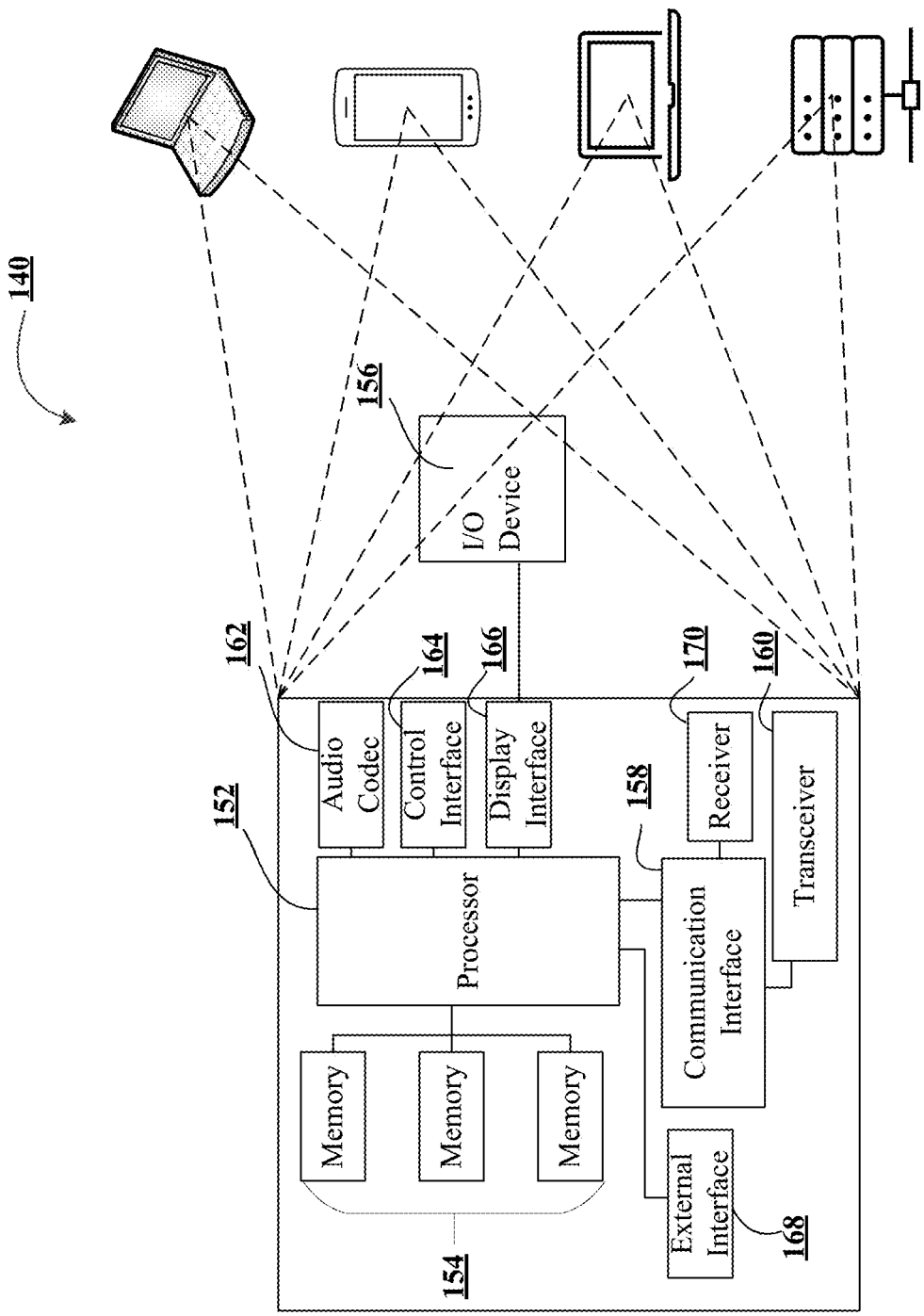
Figure 2:
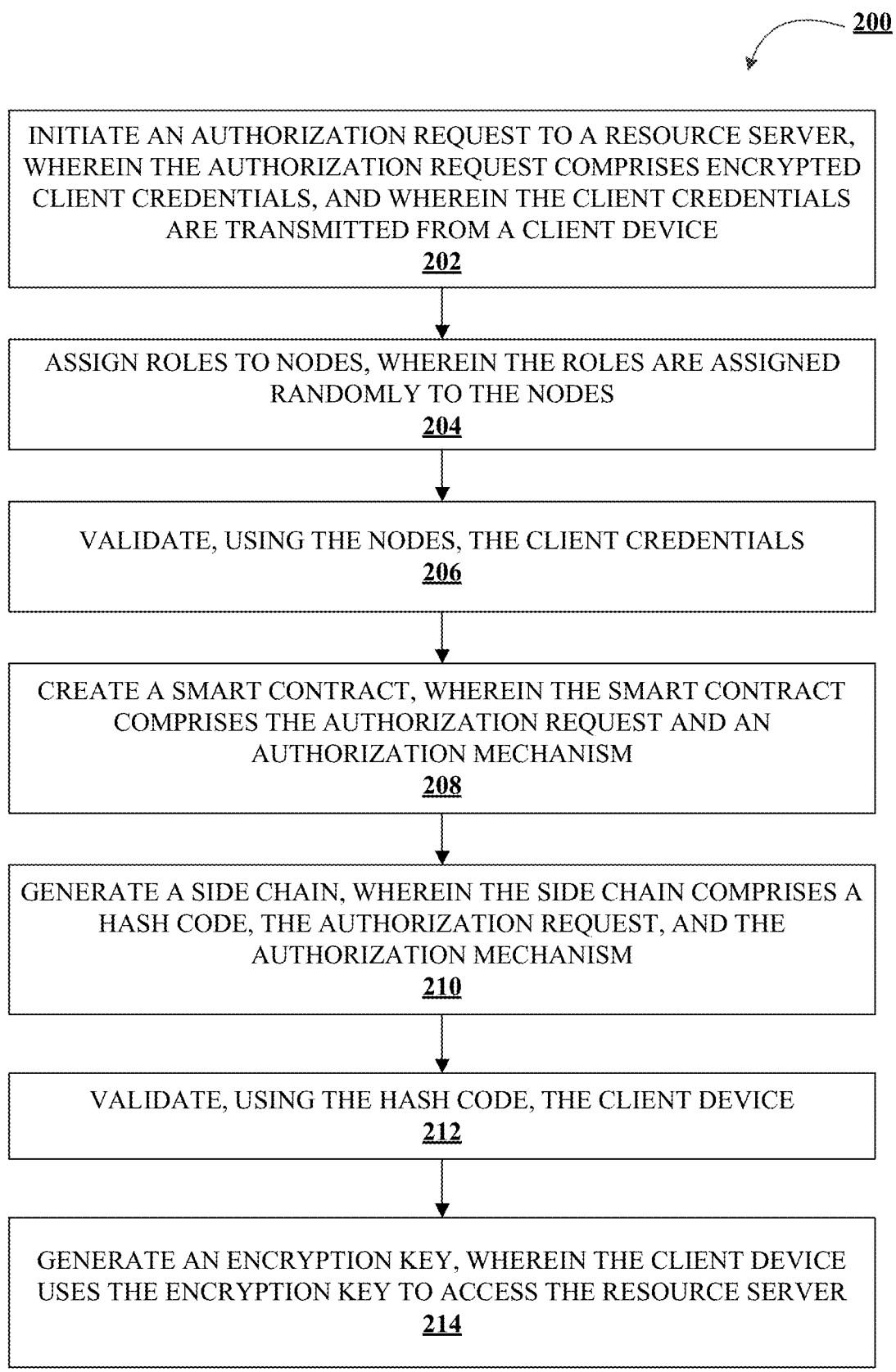
Figure 3:
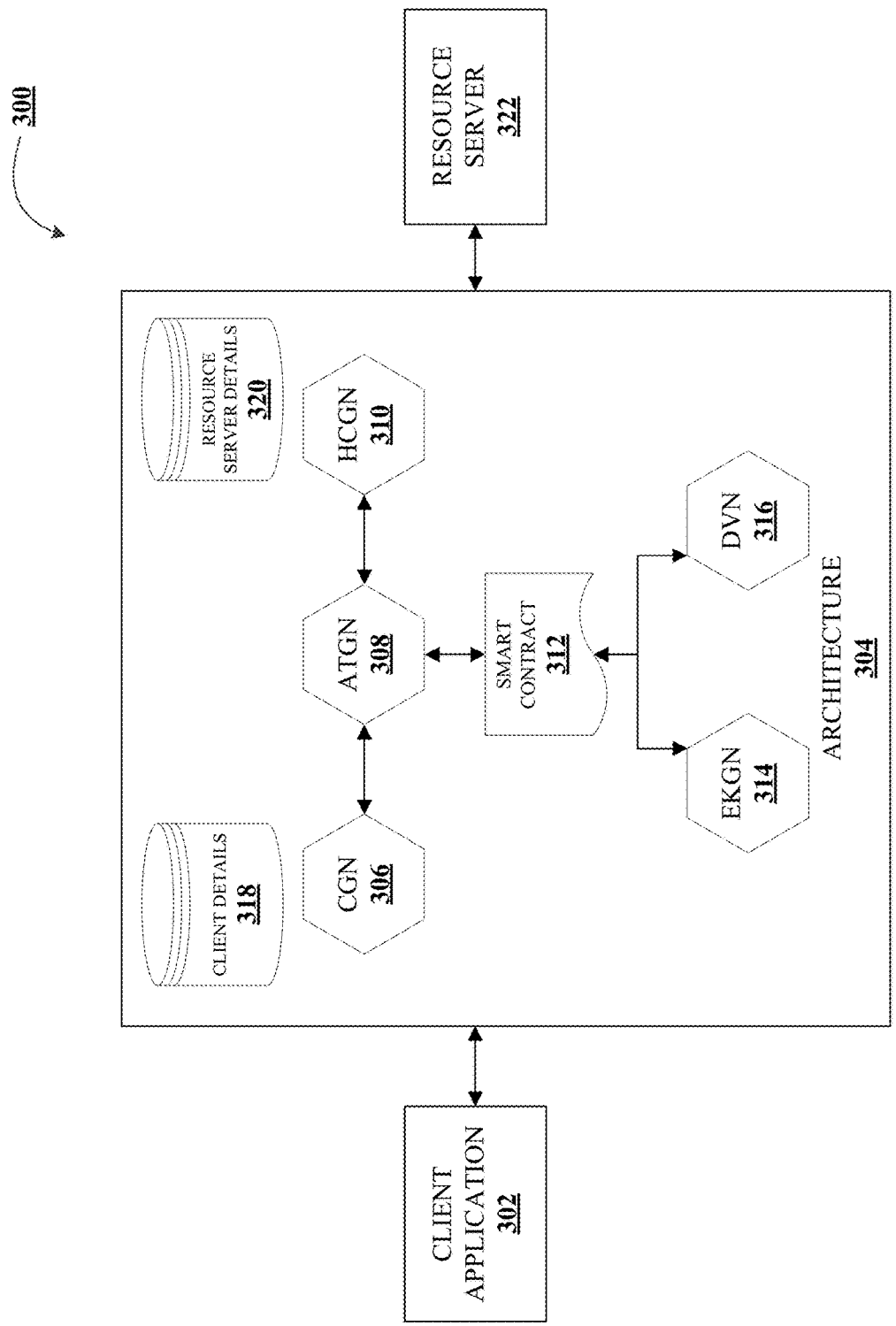
Figure 4:
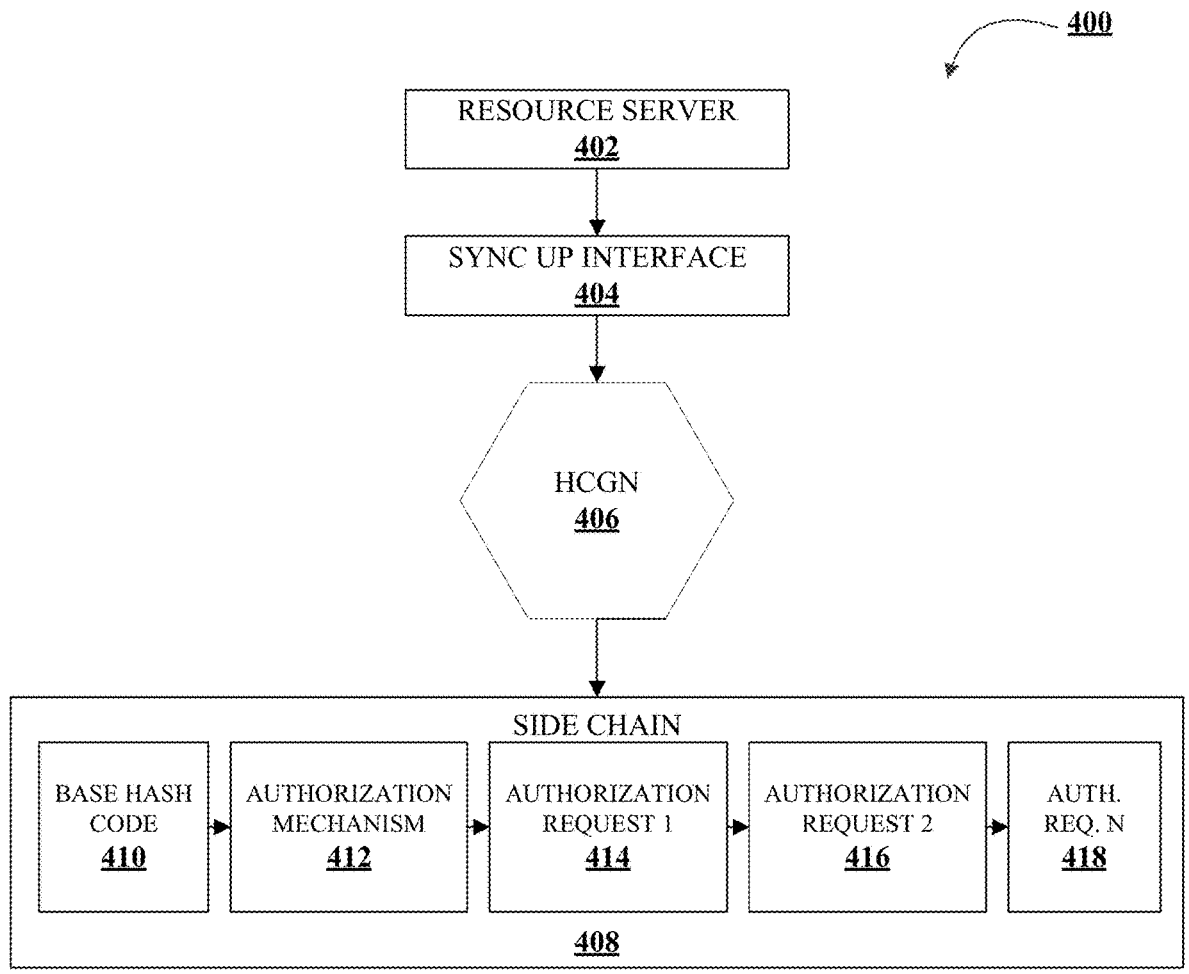

FIGS. 1A-1C illustrates technical components of an exemplary distributed computing environment for authorizing devices using a decentralized node database, in accordance with an embodiment of the disclosure;

FIG. 2 illustrates a process flow for authorizing devices using a decentralized node database, in accordance with an embodiment of the disclosure;

FIG. 3 illustrates an example embodiment of the system architecture, in accordance with an embodiment of the disclosure; and FIG. 4 illustrates an example interaction between a hash code generator node (HCGN) and a side chain, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, user information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "transfer," a "distribution," and/or an "allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

Currently there is an increasing number of misappropriations whenever a client device attempts to access a file or backend service. Throughout these types of transactions, it is critical to identify and authorize the client device using a multi-layer authentication system. Using such a highly sophisticated system makes it increasingly difficult for wrongdoers to misappropriate the transaction. In this way, adding complexity and robustness to a device authorization system allows for a more secure transaction.

The present disclosure provides a decentralized node database authorization system. The decentralized nature of the system includes assigning roles (e.g., authorization roles) to nodes associated with the decentralized database. The decentralized database may take many forms, one of which being a blockchain, wherein the blockchain is associated with an entity. The blockchain's nodes may then be assigned the authorization roles at random. Each of the newly assigned roles may include instructions that dictate how the node should respond from requests from the client device. The multi-layer nature of the system allows the client to prove its identity to the authorizing blockchain nodes. Further, a final path of key exchange is established so the final encryption key sharing between the client and resource server is shared securely.

As described herein, the present disclosure may initiate an authorization request. The authorization request may be from a client device and may include encrypted client credentials (e.g., username and password), a request resource, and a requested access level. The system may then randomly assign roles to five nodes, wherein each node may have a different role. The roles may include a certificate generator node (CGN), an access token generator node (ATGN), a hash code generator node (HCGN), an encryption key generator node (EKGN), and a data validator node (DVN).

Initially, the DVN may validate the client credentials. Based on the client credentials, such as the requested resource and/or requested access level, a smart contract may choose an authorization mechanism, wherein the authorization mechanism includes a certificate, a token, or a combination thereof. In addition, the smart contract may trigger the HCGN to generate a hash code based on the client credentials. The HCGN may request an encrypted key from the EKGN and then may encrypt the hash code using the encrypted key. The HCGN may then transmit the encrypted hash code, along with the authorization mechanism, to the client device.

The client device may decrypt the information with its private key and receive the encrypted hash code. In this way, the client device may not view the encrypted hash code because the encryption key, generated by the EKGN, is not known to it. The client device may then receive the authorization mechanism chosen by the smart contract and request physical credentials from the blockchain.

If the authorization mechanism is a certificate, the CGN may generate a certificate and corresponding hash code. The certificate will be encrypted using the key generated by EKGN and sent to the client device. If the authorization mechanism is a token, the ATGN will generate a unique token and corresponding hash code. The unique token will be encrypted using the key generated by the EKGN and sent to the client device. If the authorization mechanism is a combination of a certificate and token, the ATGN will generate a unique token and the CGN will generate a certificate. Both the certificate and token will be encrypted using the key generated by the EKGN and sent to the client device. In this way, the newly generated hash code will be chained with the previously generated hash code (and other details) so the system may identify the sequence of events.

Further, the client device's access may be read access, write access, or read-write access, depending on the requested access level. In some embodiments, the requested access level will be chained to the hash code.

The DVN may then receive the hash code sent from the client device. The hash code chain may be retrieved from the blockchain and may be subsequently used to validate client details. If the client device is validated, a new unique hash code may be encrypted with the EKGN key which the client may use to access the resource server.

What is more, the present disclosure provides a technical solution to a technical problem. As described herein, the technical problem includes issues with authorizing devices on a network in a way that is difficult to misappropriate. The technical solution presented herein allows for a multi-layer authentication system to establish authorized devices on a network. In particular, the decentralized authorization system (e.g., system 130) is an improvement over existing solutions surrounding device authorization, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

In addition, the technical solution described herein is an improvement to computer technology and is directed to non-abstract improvements to the functionality of a computer platform itself. Specifically, the decentralized authorization system (e.g., system 130) as described herein is a solution to the problem of authenticating devices on a network. Further, the decentralized authorization system may be characterized as identifying a specific improvement in computer capabilities and/or network functionalities in response to the decentralized authorization system's integration to existing devices, software, applications, and/or the like. In this way, the decentralized authorization system improves the capability of a system by using a multi-layered authorization approach when authorizing devices coupled to a network. Further, the decentralized authorization system improves the functionality of networks in response to reducing the resources consumed by the system (e.g., network resources, computing resources, memory resources, and/or the like).

FIGS. 1A-1C illustrate technical components of an exemplary distributed computing environment 100 for authorizing devices using a decentralized node database, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, resource distribution devices, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer (e.g., laptop computer, desktop computer, tablet computer, mobile telephone, and/or the like). Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed application specific integrated circuits (ASICs), computer hardware, firmware, software, and/or combinations thereof.

FIG. 2 illustrates a process flow for authorizing devices using a decentralized node database, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, a decentralized authorization system (e.g., similar to one or more of the systems described herein with respect to FIGS. 1A-1C) may perform one or more of the steps of process flow 200. For example, a decentralized authorization system (e.g., the system 130 described herein with respect to FIGS. 1A-1C) may perform the steps of process flow 200.

As shown in block 202, the process flow 200 of this embodiment includes initiating an authorization request to a resource server, wherein the authorization request includes encrypted client credentials, and wherein the client credentials are transmitted from a client device. The client device may include a device such as an end-point device, similar to end-point device(s) 140 as show in FIG. 1. The authorization request may include a request from the client device that initiates the transaction. The authorization request may include a request from the client device to the system (e.g., system 130) or to a resource server. The client credentials may include the login information associated with the client device. In this way, the login credentials may include a username, password, a personal identification number, a passcode, or the like. If a user is using the client device, the client credentials may include biometric login information wherein the user's identity may be authenticated on the client device, and subsequently sent to the system (e.g., system 130) to provide client credentials.

In some embodiments, the authorization request further includes an access level, wherein the access level defines the client device's ability to interact with the resource server. The access level may include the client device's requested access level, wherein the client device wishes to access a specific resource. For example, the client device may wish to read a specific resource in the resource server. The access level for that specific resource may be a read access level request. In another example, the resources themselves may include their own access level. In this way, the resource may have permissions associated with it that take precedence over the client device's requested access level. For instance, if a resource in the resource server has read only permissions, the access level may only be a read access level even if the client device requests write access.

In addition, the access level may be determined by the authorization request. In this way, the access level may be adjusted in response to the client credentials, the geolocation of the client device, address information related to the client device, or the like. If a client device is an untrusted device, the system may adjust the access level of certain resources based on the client device.

As shown in block 204, the process flow 200 of this embodiment includes assigning roles to nodes, wherein the roles are assigned randomly to the nodes. In some embodiments, the assignment of the roles of the nodes may be determined by a randomization algorithm. The randomization algorithm may assign roles to nodes in an unpredictable fashion. In this way, the role assignments may take advantage of the security benefits associated with unpredictability in the node-role assignment. The randomization algorithm may use different methods to assign roles to nodes, including a dynamic approach to role assignment by using conditions to assign the roles. For example, the system may use cryptographic number generation for role assignment. In this way, the randomization algorithm may produce a random set of values used to assign roles to the nodes.

In some embodiments, the system may use artificial intelligence (AI) in conjunction with the randomization algorithm to assign roles to nodes. The AI model may include generative AI models, machine learning, or the like, in order to dynamically assign roles to nodes. In this way, the AI model may ingest historical node-role assignments and determine, based on current network conditions, the current role assignment procedure. The AI model may analyze the available nodes for role assignment to determine how the node's availability, performance characteristics (e.g., processing capabilities), and the like should be factored into the role assignment. In some embodiments, the AI may feed this information to the randomization algorithm to influence the role assignment procedure. For example, if a node lacks the performance capabilities to be assigned a role, the AI model may tell the randomization algorithm to ignore that specific node when determining role assignments.

The AI model may also analyze current network conditions to maintain equitable balance across the system in determining role assignments. In this way, the AI model may balance role assignments across the available nodes of the network upon new resource transactions. Further, the AI model may be able to switch node-role assignments throughout a particular transaction if a situation arises where a node can no longer perform the assigned role.

In some embodiments, the nodes may include a certificate generator node (CGN), wherein the CGN generates the authorization mechanism, wherein the authorization mechanism includes a certificate. The CGN may automate the process of certificate issuance, management, revocation, and the like for certificates associated with the system (e.g., system 130), client device, resource server, or the like.

In some embodiments the nodes may include an encryption key generator node (EKGN), wherein the EKGN generates the encryption key. The EKGN may use asymmetric (public key) and symmetric (private key) cryptography to generate keys based on requirements of the system (e.g., system 130). The EKGN may use asymmetric key generation techniques known in the art, such as Rivest-Shamir-Adleman (RSA), Elliptical Curve Cryptography (ECC), or the like. Further, the EKGN may use advanced encryption standards, data encryption standards, or the like for symmetric key generation. The EKGN may use network conditions, hardware components, or the like for random number generation during key creation.

In some embodiments, the nodes may include a data validator node (DVN), wherein the DVN validates the client credentials. The DVN may programmatically inspect incoming data against a set of criteria defined within the system. In this way, the DVN may check incoming client device details to ensure the authorization procedure may proceed to the next step. For example, during an initiation of the resource request, the DVN may validate the client credentials. The client credentials may be stored within the system (similar to client details 318 in FIG. 3). The DVN may compare the received client credentials with the client credentials stored within the system. The DVN may also validate data formatting, data types, formats and ranges, data schemas, or the like. Further, the DVN may have built-in security measures to mitigate security concerns associated with authorizing new devices on the system's network.

In some embodiments, the nodes may include a hash code generator node (HCGN), wherein the HCGN generates the hash code. In some embodiments, the HCGN further includes a sync up interface, wherein the sync up interface updates the hash code based on an alteration of a resource associated with the resource server. As shown in FIG. 4, the resource server 402 may communicate with the sync up interface 404. The resource server 402 may include one or more resources the client device may access. In some embodiments, the resources within the resource server 402 may be altered. As used herein, altered may include updating, adding, deleting, maintaining, cleaning up, or the like of the resource within the resource server 402. In some embodiments, the resources in the resource server 402 may be altered in such a way that the client device may or may not access the resources it was initially requesting access to. In this way, the resources the client device was requesting access to may be altered so that now the resources may have a different location within the resource server, deleted altogether, updated, or the like.

In an instance in which the resources were altered, the sync up interface 404 may receive the alteration from the resource server 402 and update the HCGN 406 with the new information relating to the resources. In this way, the sync up interface 404 may provide instructions to the HCGN 406 for how to access the altered resources. For example, if a resource in the resource server 402 was deleted, the sync up interface 404 may provide the HCGN 406 with the deletion information. In another example, if a resource was newly added to the resource server 402, and the client device was initially requesting access to that resource, the sync up interface 404 may update the HCGN 406 as to the location of the newly added resource. The sync up interface 404 may also provide information to the HCGN 406 for resources that have been altered by way of updating, versioning up, maintenance, or the like.

Once the HCGN 406 has received alteration instructions (e.g., information) from the sync up interface 404, the HCGN 406 may use those alteration instructions to update the side chain 408. In this way, the HCGN 406 may update hash codes associated with the side chain 408. In some embodiments, if a resource was altered, the HCGN 406 may update an authorization request associated with that resource. For example, an authorization request (e.g., authorization request 1 414) may be altered due to the resource associated with authorization request 1 414 being altered within the resource server 402. The HCGN 406 may then update the associated hash code with the authorization request 1 414 in the side chain 408. In another example, the addition of a new resource, which may be associated with authorization request N 418, may have a hash code added by the HCGN 406.

Further, the sync up interface 404 may also provide instructions to the HCGN 406 for alterations that happen to the base hash code 410 or to the authorization mechanism 412. In this way, if the base hash code 410 or the authorization mechanism 412 are altered due to a resource change in the resource server 402, the sync up interface 404 may tell the HCGN 406 to update the associated hash codes in the side chain 408.

In some embodiments, the nodes may include an access token generator node (ATGN), wherein the ATGN generates the authorization mechanism, wherein the authorization mechanism includes a token. The ATGN may generate tokens that serve as authentication processes when accessing the system. The tokens may allow the client device to access the resource server for a period of time defined by the token. The allocation of time for access may be defined by the system, one of the nodes, the authorization request, the resource, the resource server, or the like.

As shown in FIG. 3, an example embodiment of the system architecture is disclosed. The client device may include a client application 302 that interacts with the system (e.g., system 130), architecture 304, resource server 322, or the like. The system architecture 304 may include an arrangement of the nodes that will be assigned roles to validate the client device and allow it to access the resource server 322. The client details 318 may be stored within the architecture 304. The client details 318 may include the client credentials, authorization request, requested access level, and the like, where the client details 318 may originate from the client application 302. The DVN 316 may validate the client credentials sent from the client application 302. The smart contract 312 may choose the authorization mechanism and may communicate with the ATGN 308 and CGN 306. The ATGN 308, CGN 306, or both may then create a token, certificate, or both (respectively), that may be used in further communication with the client application 302.

The smart contract 312 may also trigger the HCGN 310 to generate a hash code, wherein the HCGN 310 may use the authorization request as input for the hash code generation. The HCGN 310 may then request an encrypted key from the EKGN 314 and encrypt the has code using the generated encryption key, authorization, and/or other details associated with the transaction. These hash code generations may be included in the side chain (similar to the side chain 408 shown in FIG. 4). The HCGN 310 may transmit the encrypted hash code, along with the chosen authorization mechanism, to the client application 302.

The client application 302 may decrypt the received information with the client application's 302 private key and receive the encrypted hash code. In this way, the client application 302 may not view the hash code because it lacks the encryption key generated by the EKGN 314. However, the client application 302 receives the authorization mechanism chosen by the smart contract 312. The client application 302 may request physical credentials from system.

If the chosen authorization mechanism is a certificate, the CGN 306 may generate a certificate and corresponding hash code. The certificate may be encrypted using the encryption key generated by the EKGN 314, along with other transactional details, and may be added to the side chain.

If the chosen authorization mechanism is a token, the ATGN 308 may generate a token and corresponding hash code. The token may be encrypted using the encryption key generated by the EKGN 314, along with other transactional details, and may be added to the side chain.

If the chosen authorization mechanism is a combination of a certificate and a token, both the ATGN 308 and CGN 306 may generate a token and certificate, respectively, and corresponding hash code. The certificate and token may be encrypted using the encryption key generated by the EKGN 314, along with other transactional details, and may be added to the side chain.

The client application 302 may transmit the hash code chain and side chain to the DVN 316. The hash code and side chain may be validated by the system to validate the client application 302. Upon successful validation of the client application 302, a new hash code may be generated and encrypted with a new encryption key generated by the EKGN 314. The client application 302 may then be able to access the resource server 322.

As shown in block 206 of FIG. 2, the process flow 200 of this embodiment includes validating, using the nodes, the client credentials. In some embodiments, the DVN may be used to validate the client credentials. The client credentials may include login information, as mentioned above, which may be checked by the DVN against the credentials stored within the system.

As shown in block 208, the process flow 200 of this embodiment includes creating a smart contract, wherein the smart contract includes the authorization request and an authorization mechanism. In some embodiments, the authorization mechanism further includes a certificate, a token, or a combination of the certificate and the token. As mentioned above, the authorization mechanism may be created by the CGN or ATGN.

In some embodiments, the authorization mechanism may be determined by the authorization request and a model, wherein the model includes logic to determine the authorization mechanism. The logic associated with the model may include determining what type of resource is being requested, the access level, the amount of time associated with the access, or the like. In this way, the smart contract may choose an authorization mechanism that suits the needs of the client device while maintaining security of the system and resource server. For example, the client device may request access to a resource for read write access. The smart contract may choose a token with a limited access time in order to maintain security of the resource, while still providing access to the resource requested.

As shown in block 210, the process flow 200 of this embodiment includes generating a side chain, wherein the side chain includes a hash code, the authorization request, and the authorization mechanism. The side chain may include information associated with the resource transaction that provide details about how the system should respond to the client device's request. In this way, the side chain may maintain a ledger that shows what has been request by the client, what the system allows, what security measures are in place, updates to the transaction, authorizations associated with the transaction, or the like. For example, the client device may request an access level for a particular resource. The side chain may reflect that request through the authorization strings. If the client device requests access to another resource, for example, the side chain may be updated to reflect the new resource request.

As shown in block 212, the process flow 200 of this embodiment includes validating, using the hash code, the client device. The hash code may be generated based on the authorization request, client credentials, client device details, or the like. The hash code received from the client device and the hash code within the system may be compared to validate the client device.

In some embodiments, the side chain may be included within the compared hash codes. For example, the client may request access to a specific resource, which may be encoded into the side chain (e.g., as an authorization string). The hash code sent from the client device and the hash code in the system may then be compared to determine if the authorization string is present in both hash codes.

As shown in block 214, the process flow 200 of this embodiment includes generating an encryption key, wherein the client device uses the encryption key to access the resource server. The encryption key may have parameters to restrict the client device's access to resources within the resource server. The parameters may include time to access, which resources the client has access to, or the like. In this way, the encryption key may limit the client device to particular areas within the resource server.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for authorizing devices using a decentralized node database, the system comprising:
   a processing device;
   a non-transitory storage device containing instructions when executed by the processing device, causes the processing device to perform the steps of:
      initiate an authorization request to a resource server, wherein the authorization request comprises encrypted client credentials, and wherein the client credentials are transmitted from a client device;
      assign roles to nodes, wherein the roles are assigned randomly to the nodes;
      validate, using the nodes, the client credentials;
      create a smart contract, wherein the smart contract comprises the authorization request and an authorization mechanism;
      generate a side chain, wherein the side chain comprises a hash code, the authorization request, and the authorization mechanism;
      validate, using the hash code, the client device; and
      generate an encryption key, wherein the client device uses the encryption key to access the resource server.

2. The system of claim 1, wherein the assignment of the roles to the nodes is determined by a randomization algorithm.

3. The system of claim 1, wherein the authorization request further comprises an access level, and wherein the access level defines the client device's ability to interact with the resource server.

4. The system of claim 1, wherein the authorization mechanism further comprises a certificate, a token, or a combination of the certificate and the token.

5. The system of claim 4, wherein the authorization mechanism is determined by:
   the authorization request; and
   a model, wherein the model comprises logic to determine the authorization mechanism.

6. The system of claim 1, wherein the nodes further comprise:
   a certificate generator node (CGN), wherein the CGN generates the authorization mechanism, wherein the authorization mechanism comprises a certificate;
   an encryption key generator node (EKGN), wherein the EKGN generates the encryption key;
   a data validator node (DVN), wherein the DVN validates the client credentials;
   a hash code generator node (HCGN), wherein the HCGN generates the hash code; and
   an access token generator node (ATGN), wherein the ATGN generates the authorization mechanism, wherein the authorization mechanism comprises a token.

7. The system of claim 6, wherein the HCGN further comprises a sync up interface, wherein the sync up interface updates the hash code based on an alteration of a resource associated with the resource server.

8. A computer program product for authorizing devices using a decentralized node database, the computer program product comprising a non-transitory computer-readable medium comprising code causing an apparatus to:
   initiate an authorization request to a resource server, wherein the authorization request comprises encrypted client credentials, and wherein the client credentials are transmitted from a client device;
   assign roles to nodes, wherein the roles are assigned randomly to the nodes;
   validate, using the nodes, the client credentials;
   create a smart contract, wherein the smart contract comprises the authorization request and an authorization mechanism;
   generate a side chain, wherein the side chain comprises a hash code, the authorization request, and the authorization mechanism;
   validate, using the hash code, the client device; and
   generate an encryption key, wherein the client device uses the encryption key to access the resource server.

9. The computer program product of claim 8, wherein the assignment of the roles to the nodes is determine by a randomization algorithm.

10. The computer program product of claim 8, wherein the authorization request further comprises an access level, and wherein the access level defines the client device's ability to interact with the resource server.

11. The computer program product of claim 8, wherein the authorization mechanism further comprises a certificate, a token, or a combination of the certificate and the token.

12. The computer program product of claim 11, wherein the authorization mechanism is determined by:
   the authorization request; and
   a model, wherein the model comprises logic to determine the authorization mechanism.

13. The computer program product of claim 8, wherein the nodes further comprise:
   a certificate generator node (CGN), wherein the CGN generates the authorization mechanism, wherein the authorization mechanism comprises a certificate;
   an encryption key generator node (EKGN), wherein the EKGN generates the encryption key;
   a data validator node (DVN), wherein the DVN validates the client credentials;
   a hash code generator node (HCGN), wherein the HCGN generates the hash code; and
   an access token generator node (ATGN), wherein the ATGN generates the authorization mechanism, wherein the authorization mechanism comprises a token.

14. The computer program product of claim 13, wherein the HCGN further comprises a sync up interface, wherein the sync up interface updates the hash code based on an alteration of a resource associated with the resource server.

15. A method for authorizing devices using a decentralized node database, the method comprising:
   initiating an authorization request to a resource server, wherein the authorization request comprises encrypted client credentials, and wherein the client credentials are transmitted from a client device;
   assigning roles to nodes, wherein the roles are assigned randomly to the nodes;
   validating, using the nodes, the client credentials;
   creating a smart contract, wherein the smart contract comprises the authorization request and an authorization mechanism;
   generating a side chain, wherein the side chain comprises a hash code, the authorization request, and the authorization mechanism;
   validating, using the hash code, the client device; and
   generating an encryption key, wherein the client device uses the encryption key to access the resource server.

16. The method of claim 15, wherein the assignment of the roles to the nodes is determined by a randomization algorithm.

17. The method of claim 15, wherein the authorization request further comprises an access level, and wherein the access level defines the client device's ability to interact with the resource server.

18. The method of claim 15, wherein the authorization mechanism further comprises a certificate, a token, or a combination of the certificate and the token.

19. The method of claim 18, wherein the authorization mechanism is determined by:
the authorization request; and
a model, wherein the model comprises logic to determine the authorization mechanism.

20. The method of claim 15, wherein the nodes further comprise:
a certificate generator node (CGN), wherein the CGN generates the authorization mechanism, wherein the authorization mechanism comprises a certificate;
an encryption key generator node (EKGN), wherein the EKGN generates the encryption key;
a data validator node (DVN), wherein the DVN validates the client credentials;
a hash code generator node (HCGN), wherein the HCGN generates the hash code; and
an access token generator node (ATGN), wherein the ATGN generates the authorization mechanism, wherein the authorization mechanism comprises a token.

\* \* \* \* \*